United States Patent [19]

Colon et al.

[11] 4,325,851

[45] Apr. 20, 1982

[54] WATER-ACTIVATABLE HOT-MELT ADHESIVES

[76] Inventors: Herman Colon, 2, Sobrisco St., Monsey, N.Y. 10952; Albert Maletsky, 732 Iron Latch Rd., Franklin Lakes, N.J. 07417

[21] Appl. No.: 200,392

[22] Filed: Oct. 24, 1980

[51] Int. Cl.³ .............................................. C08K 5/09
[52] U.S. Cl. ................................. 524/83; 156/331.6; 524/232; 524/313; 524/322; 524/377
[58] Field of Search ............ 260/23 R, 23 H, 28.5 R, 260/28.5 AV

[56] References Cited

U.S. PATENT DOCUMENTS

| | | | |
|---|---|---|---|
| 3,462,342 | 8/1969 | Cooper | 260/13 |
| 3,576,776 | 4/1971 | Muszik | 260/23 R |
| 3,852,231 | 12/1974 | Huebschmann | 260/28.5 R |
| 3,888,811 | 6/1975 | Sirota | 260/23 R |

*Primary Examiner*—Paul R. Michl
*Attorney, Agent, or Firm*—Erwin S. Teltscher

[57] ABSTRACT

This invention relates to water-activatable hot-melt adhesives. More specifically, it relates to such adhesives having non-blocking qualities at high humidity at higher pressures than have been used heretofore.

8 Claims, No Drawings

WATER-ACTIVATABLE HOT-MELT ADHESIVES

BACKGROUND OF THE INVENTION

Water-activatable adhesives are among the most common type of adhesives generally used by the general public. These include such uses as envelope-flap adhesives, postage stamp adhesives, bindery tapes and sealing tapes. In all such uses the dry adhesive in situ, on a substrate, usually of paper film or cloth, is activated by moisture, water, or commonly saliva, to provide an active adhesive for adhering the substrate to the desired surface.

Water-activatable adhesives can be applied as a coating to the substrate from solution or emulsion in either water or organic solvent and then drying the coating by evaporation or distillation of the water or solvent. The coating can also be applied by coating from a hot-melt of the adhesive. The coated article is then ready for storage until ready for use, at which time the coating is moistened and thus activated.

Water-activatable adhesive coats, applied from organic solvent solutions, entail complex and costly procedures since the solvent must be confined and collected either for cost recovery, or environmental considerations.

Similarly, coats prepared from aqueous solutions or waterbased emulsions also entail considerable energy expenditure in rapidly heating the coated matrix to remove the water as solvent and thus dry the adhesive coat sufficiently for storage until used.

Hot-melt adhesives entail none of the above complexities but do have certain problems. The hot-melt adhesives are generally applied by melting the composition and then coating a molten layer on the substrate. This coated material is then cooled to harden the coat and is ready for storage.

Hot-melt adhesive compositions must meet certain stringent criteria. The melting point of the composition must be sufficiently low so that the molten mass need not be heated to temperatures which would affect the substrate or would cause decomposition of the adhesive in the applicator machinery (pot-life).

The melted composition should have a suitably low viscosity for use in applicators and a sufficiently low liquid surface-tension or surfactancy to properly wet the substrate with the adhesive. The coating composition must be sufficiently flexible so that the hardened coat will not flake off.

The hot-melt coating must also be capable of storage under conditions normally encountered without blocking, i.e. adhering, due to activating of the adhesive by the combination of ambient humidity, temperature and contact pressure. The non-blocking quality is industrially important since envelopes, stamps and sealing tapes are often stored under high ambient humidity and in packages or rolls where tension and resilient contact pressure between adjacent layers may cause activation of the adhesive.

The water-activatable, hot-melt adhesive should, by definition, also develop a good adherent bond between the coated substrate and another coated or uncoated surface after activating the coating with water. The bond from the activated coating must also be consistent in that the application of water (or saliva) will uniformly wet and uniformly activate the coating or coated areas. Too often, the prior art adhesives, particularly after long storage, do not rapidly and uniformly wet and activate. The moisture droplets merely bead up on the surface of the adhesive layer and don't activate it.

The above problems have been recognized in the art. The prior-art compositions directed to water-activatable hot-melt adhesives are primarily based on plasticized N-vinyl lactam copolymers, specifically vinyl pyrrolidone-vinyl acetate (VP/VA) copolymers. Most of the adhesive plasticizers have been based on polyethylene glycol (PEG's). Specifically U.S. Pat. Nos. 3,345,32 and 3,462,342 are based on such compositions. Both are capable of storage without activation at up to 50% relative humidity. However 50% relative humidity is a condition requiring special storage facilities. In addition, the patented compositions particularly U.S. Pat. No. 3,462,342 have short pot-life at melt application temperatures. The plasticizers in these compositions were based on liquid PEG's of molecular weights of about 1000. The U.S. Pat. No. 3,852,231 adhesive, while non-blocking, is extremely heat sensitive. It requires that the pot temperature be kept below 300° F. Should the pot temperature rise above 300° F. for any time, self-polymerization will be initiated, causing the viscosity of the melt to rise. Within a short time, often hours, the pot contents will gel and ultimately solidify. This short pot-life severely limits the usefulness of these compositions.

U.S. Pat. No. 3,888,811, while non-blocking to about 83% humidity, is only non-blocking at such humidity levels at low pressures, i.e. up to about 0.5 p.s.i.g. At higher pressures blocking has been noted. Such blocking under pressure interferes with storage of the coated materials prior to activation.

U.S. Pat. No. 3,852,231 teaches hot-melt, water-remoistenable adhesives also based upon the aforesaid VP/VA copolymers modified by the addition of PEG as a plasticizer and adhesion promoter and phthalate or benzoate ester plasticizers. To control the setting of the hot-melt upon application to the substrate and also to some degree to prevent blocking when the softening point of the polymer is reduced (by choice of copolymer ratios or reduction of the amounts of ester plasticizers), a mineral-type wax is added to the melt. These waxes, are naturally occurring esters of long chain acids such as montanic acid ($C_{27-28}$). Also mentioned in this reference is the recognized repulsive flavor of the prior art adhesives and a recommendation is made therein that urea and its precursors be added to promote good taste.

Spot-coated envelope blanks are usually stored in rolls prior to cutting and assembly. The contact pressure in such rolls, as well as sealing tapes, is commonly up to about 1.0 p.s.i. Similarly stamp rolls and stacked sheets of stamps often are subject to considerable contact pressure. The water-activatable adhesive-coated assemblies should not block even at 87% relative humidity and about 1.0 p.s.i.

Another criterion to be met by such water-activatable adhesives is that the resultant dry coating should have an acceptable taste. While moistening by saliva may be decried for sanitary reasons, the fact remains that it is a most convenient method for spontaneously applying moisture, i.e. "licking envelopes and stamps".

Also criteria to be met are the hot-melt characteristics of the formulations. The adhesive should have good pot-life, at least 30–40 hours at usual application temperatures of about 350° F. It must have low viscosity characteristics at these temperatures and the viscosity of the hot-melt should be substantially constant during the pot-life of the hot-melt.

In addition, the selected adhesive formulations must be economically viable, i.e. should contain minimal amounts of the expensive VP/VA copolymer and/or esoteric ingredients such as the expensively purified mineral waxes.

SUMMARY OF THE INVENTION

The above criteria are met by the present invention which is based upon the discovery that portions of the VP/VA copolymer in the adhesives can be replaced by a cheaper polymer which previously had been used primarily as the main ingredient for non-water activatable hot-melt adhesives; the finding that free fatty acids and mixtures thereof having chains of substantially at least 14 carbon atoms and having acid numbers of about 160, but preferably in the range 190 to 210, will promote pot-life; raise the flow-point temperature and will keep the viscosity of the adhesive during its pot-life within acceptable limits, while affording excellent ease of application. In addition, the adhesives of this invention are non-blocking up to 87% humidity under 1 p.s.i. load at 22° C. (73° F.), yet exhibit almost instantaneous remoistening and adhesion with either water or saliva without any inherent objectionable flavors or odors. (Rosin acids and tall oil acids render the product bitter.)

This invention is based upon the formulations comprising:

(a) 30 to 70 wt% of polymers comprising 30 to 60 wt% of a water-sensitive vinyl pyrrolidone/vinyl acetate copolymer (VP/VA) wherein the weight ratio of the VP moiety to the VA moiety ranges between 3:1 and 1:3; and 0 to 25 wt% of an ethylene/vinyl acetate (E/VA) copolymer containing 17 to 40 wt% of VA;

(b) 5 to 12 wt% of at least one free mono-basic saturated long chain fatty acid having an acid number in excess of 160, preferably in the range 190 to 210; and (c) 0 to 30 wt% of at least one wax selected from the group consisting of solid water-soluble poly-ethylene glycol waxes in the molecular weight range from 4000 to 20,000 and water insoluble ester waxes.

DETAILED DESCRIPTION AND PREFERRED EMBODIMENTS

The copolymer ingredients of the adhesive formulations of this invention are based upon vinyl pyrrolidone/vinyl acetate (VP/VA) copolymers. These copolymers are water-sensitive and the range of monomer components ranges from 3:1 to 1:3 by weight of each moiety. Within this range the flow points of the copolymer are satisfactory for the hot-melt formulations of this invention.

A satisfactory copolymer in the solid state is marketed by GAF Corp. (NYC, N.Y., USA) under the trade name PVP 630. This is a 60/40 VP/VA copolymer. Other polymers of different proportions are commercially available with most being marketed in solution form by GAF (USA) and BASF (W. German). Such products require removal of the solvents before or during the preparation of the hot-melt. The water-sensitivity of these copolymers provides the water-activatable quality of the final adhesive formulation when coated on the substrate.

The amount of polymer in the formulation may range from about 30 to 70 wt%. However for purposes of this invention the range of VP/VA copolymer content is 30 to 60 wt%. At VP/VA amounts below this range the flow point (defined as the temperature at which the material begins to flow) of the solidified adhesive becomes too low, and blocking may occur. Within this desired range, the flow point of the polymer-based formulations, if too low, may be controlled within the desired ranges by optimally replacing some of the VP/VA copolymer with an ethylene/vinyl acetate copolymer (E/VA) in amounts up to 25 wt% of the total formulation.

Such ethylene/vinyl acetate copolymers are marketed by several companies such as duPont (Delaware USA) under the "Elvax" trade name. The vinyl acetate content of these copolymers suitable for inclusion in the formulations of this invention ranges from about 17 to 29%.

Preferred are the copolymers at the lower end of the range, as they are the most compatible with the VP/VA copolymers. The Elvax 410 series copolymer having VA content of 17.5 to 18.5% is preferred. It has a melt Index (ASTM D1238) of 455-550. The E/VA copolymer, unlike the VP/VA copolymer is not water-sensitive. It has been used as a major polymer component in direct-sealing hot-melt adhesives, that is, in adhesives where the melt is applied and the surfaces joined before the melt solidifies. Water has no part in the joining process with these adhesives which are not considered to be water-activatable.

However, in the present formulations the addition of E/VA to the VP/VA improves the non-blocking qualities without in any way interfering with the water-activatable adhesive properties.

The total polymer content (a) of the formulations of this invention ranges from 30 to 70 wt% with from 30 to 60 wt% being VP/VA and 0 to 25 wt% being E/VA. As additional advantage of substituting E/VA for some of the VP/VA is the cost factor. VP/VA costs approximately five times more than E/VA.

The fatty acids (b) useful for the present invention are aliphatic, straight-chain, saturated, non-cyclic, free fatty acids.

Most of the useful fatty acids are completely hydrogenated, i.e. where all the original double bonds of the fats are saturated. These fatty acids are marketed in their naturally occurring proportions as derived from fats, and natural oils, such as vegetable oil. The chains of these fatty acids contain at least 14 carbons and run up to about 24 carbons. The preponderant and preferred chain length of these free, fatty acids are 16 to 18 carbons. As these are free, fatty acids, containing no esterifying alcohols, their acid numbers (ASTM D-1386) are high, ranging upwards from about 160, and preferably about 190-210. The commercially available, free, fatty acid mixtures may be blended and the blends are selected, so that the composition of the fatty acid is stable at 350° F. for at least 48 hours. The presence of any materials in the mixture that are volatile or reactive with the polymers of the formulation up to 350° F. should be avoided. Reactivity is measured by any significant increase in the viscosity of the melt after 24 and 48 hours at the preferred application temperature of 350° F. The fatty acids as discussed above are used in amounts of from 5 to 12 wt% for their unique modification of the non-blocking quality in the formulation even at high contact-pressure and high humidity at temperatures up to at least 83° F.

As is common in this art, it is preferred to modify the physical properties of the final formulation by the addition of waxy materials (c) selected from the group consisting of solid water-soluble, waxy, polyethyene glycols or polyoxyethylene glycols (PEG) and water-insoluble ester waxes. The commercial water-soluble solid PEG waxes range in molecular weight from about 4000 up to about 20,000. Originally these were marketed by Union Carbide under the Carbowax trade name. Other sources of equivalent materials are now available. The PEG waxes improve the adhesion by affecting the surfactancy of the formulations. In certain formulations where the surfactancy is adequate, the PEG waxes may be eliminated. The water-insoluble, solid, ester waxes are used to help improve the blocking resistance of the formulation at higher humidity, but must be used with caution as they may slow remoistenability of the coating. In formulations with satisfactory non-blocking properties, these waxes may be omitted.

The insoluble waxes for this invention include the monobasic fatty acid esters, such as saturated water-insoluble waxes including the hard carnauba, candelilla and cetyl waxes (spermaceti) as well as synthetic waxes such as N-stearyl-12-hydroxystearamide; N-hydroxyethyl and N,N bis hydroxyethyl stearamides; glyceryl trihydroxy-stearate (from Glyco chemicals) and hydrogenated castor oil, marketed as Castorwax by N. L. Industries, USA. Generally the combined amounts of water-soluble and insoluble waxes are preferred to range from about 5 to 30 wt% of the formulations. It has been noted that waxes reduce the tendency to blocking. As waxes increase the viscosity of the hot-melt, for ease of application to the substrate, it is wise nevertheless to use the waxes judiciously, since an excess in the formula could lead to poor bonding characteristics.

The following formulations are representative and preferred for specific uses. It must be realized that no one formulation is satisfactory for all substrates. Newsprint, bond, Kraft varying rag content papers and even textile substrates require different and varying formulations within the stated ranges. In addition, cost considerations may require use of some of the formulations, within the stated ambit of the formulations of this invention, basically comprising 30 to 70 wt% of polymer, at least 30 to 60% of which is VP/VA and 5 to 12 wt% of a saturated, straight-chain, fatty acid of 14 to 24 carbon atom chain length.

The optional presence of the waxes as well as optional use of antioxidants, plasticizers, surfactants, antibacterials, saccharin, essential oil perfumes, and similar special function additives common to this art may be used within the ambit of the invention. All art-recognized equivalents of the mentioned additives are intended for equivalent substitution.

EXAMPLE 1

VP/VA copolymer (water-sensitive copolymer): 46.5 wt%
E/VA Elvax 410 (copolymer extender): 8.0
Emersol 150 (free fatty acid): 8.0
Carbowax 4000: 10.6
Carbowax 20,000: 5.4
Castorwax: 9.0
Resoflex R 296 (resinous esters): 4.9
Rosin Ester (tackifier): 8.0
Antioxidant: 0.2
Saccharin: 0.1

The mixture is melted in the usual fashion. Its initial viscosity at 350° F. is 7,500 cps and, after aging, 350° F. for 48 hours is still within the acceptable limit of 8000 cps. The usual 1 p.s.i./87% relative humidity at 73° F. blocking test results are more than satisfactory, as are the remoistening speed and tear strength. The pot-life and pot color are also satisfactory.

EXAMPLE 2

VP/VA copolymer 60/40: 43.5 wt%
Elvax (E/VA) 410: 17.4
Emersol 150: 8.7
Carbowax 4000: 17.4
Castorwax: 4.5
Rosin Ester: 8.7
Antioxidant: 0.2
Saccharin: 0.1

The resultant adhesive melt met all the test criteria as set forth in Example 1.

EXAMPLE 3

VP/VA copolymer 60/40: 44.2 wt%
Emersol 871: 7.1
Carbowax 6000: 10.6
Castorwax: 7.8
Glycerol Monostearate: 5.6
Acrawax C: 3.8
Dantoest DHE DL: 3.8
Rosin Ester: 8.0
AC 5120 (polymer extender): 8.8
Antioxidant: 0.2
Saccharin: 0.1

The melt formulation satisfactorily met the test criteria as listed in Example 1.

EXAMPLE 4

VP/VA copolymer: 48.5 wt%
Emersol 871: 8.5
Carbowax 6000: 12.7
Castorwax: 8.5
Acrawax C: 3.5
Aldo MS (water-insoluble wax): 5.6
Dantoest DHE DL: 4.2
Tall oil ester: 8.5
Antioxidant: 0.2
Saccharin: 0.1

This formulation satisfactorily meets the test criteria set forth in Example 1 and is preferred for envelope stock.

EXAMPLE 5

VP/VA copolymer: 43.75 wt%
E/VA (Elvax 410): 18.75
Carbowax 4000: 12.50
Carbowax 20,000: 6.25
Emersol 150: 6.25
Castorwax: 12.50
Anti-oxidant: 0.1

This hot melt adhesive meets the standard test criteria of Example 1.

EXAMPLE 6

VP/VA copolymer: 45.0 wt%
E/VA copolymer: 18.2
Emersol 150: 9.0
Carbowax 4000: 18.2

Tall Oil ester: 9.1
Anti-oxidant: 0.5

This melt-adhesive without water-insoluble wax met the criteria of Example 1 satisfactorily.

EXAMPLE 7

VP/VA copolymer: 59.0 wt%
Emersol 150: 14.5
Benzoflex 432 (benzoate ester plasticizer): 25.0
Acrawax: 1.0
Anti-oxidant: 0.5

This melt-adhesive without water-soluble wax or E/VA copolymer met the criteria of Example 1 satisfactorily.

We claim:

1. Water-activatable, hot-melt, applied adhesive compositions comprising:
   (a) 30 to 70 wt% of polymers comprising 30 to 60 wt% of a water-sensitive vinyl pyrrolidone/vinyl acetate copolymer wherein the weight ratio of the vinyl pyrrolidone moiety to the vinyl acetate moiety ranges from between about 3:1 to 1:3 and 0 to 25 wt% of an ethylene/vinyl acetate copolymer containing from about 17 to 40 wt% of vinyl acetate;
   (b) 5 to 12 wt% of at least one free monobasic, saturated, long-chain, fatty acid having chain-lengths preponderantly of about 16 to 20 carbon atoms, said fatty acid having an acid number greater than about 160; and
   (c) 0 to 30 wt% of at least one wax selected from the group consisting of solid water-soluble polyethylene glycol waxes and water-insoluable ester waxes.

2. The composition according to claim 1 wherein said vinyl pyrrolidone/vinyl acetate copolymer has a ratio of 60:40 vinyl pyrrolidone to vinyl acetate.

3. The composition according to claim 1 wherein the free, fatty acid has an acid number above about 190.

4. The composition according to claim 1 wherein the ethylene/vinyl acetate copolymer has a vinyl acetate content of substantially about 18 wt %.

5. The composition according to claim 1 wherein said solid polyethylene glycol wax has a molecular weight in the range 4000 to 20,000.

6. The composition according to claim 1 containing:
Vinyl pyrrolidone/vinyl acetate copolymer 60/40: 43.5
Ethylene/vinyl acetate copolymer: 17.4
Free fatty acid: 8.7
Polyethylene glycol m.w. 4000: 17.4
Hydrogenated castor wax oil: 4.5
Tackifier: 8.7
Anti-oxidant: 0.2
Saccharin: 0.1

7. The composition according to claim 1 containing:
Vinyl pyrrolidone/vinyl acetate: 48.5
Free fatty acid: 8.5
Polyethylene glycol m.w. 6000: 12.7
Hydrogenated castor wax oil: 8.5
Water-insoluble stearamide wax: 3.5
Water-insoluble fatty acid ester of glycerine: 5.6
Plasticizer: 4.2
Tackifier: 8.5
Anti-oxidant: 0.2
Saccharin: 0.1

8. The composition according to claim 1 containing:
Vinyl pyrrolidone/vinyl acetate copolymer 60/40: 43.75
Ethylene/vinyl acetate copolymer (18% vinyl acetate): 18.75
Free, fatty acid: 6.25
Hydrogenated castor wax oil: 12.50
Polyethylene glycol m.w. 4000: 12.50
Polyethylene glycol m.w. 20,000: 6.25

* * * * *